United States Patent Office 3,201,423
Patented Aug. 17, 1965

3,201,423
PROCESS FOR OXIDIZING ALKYL BENZENES TO PHTHALIC ANHYDRIDE
Ralph Landau, Northport, N.Y., assignor to Mid-Century Corporation, Chicago, Ill., a corporation of Delaware
No Drawing. Filed Dec. 8, 1961, Ser. No. 158,123
10 Claims. (Cl. 260—346.4)

This invention relates to the preparation of phthalic anhydride and more specifically pertains to the preparation of phthalic anhydride by the vapor phase partial oxidation of 1,2-dialkyl benzenes and a unique purification step in the recovery of purified phthalic anhydride therefrom.

In the preparation of phthalic anhydride by the vapor phase partial oxidation of 1,2-dialkyl benzenes such as ortho-xylene, phthalide forms as one intermediate oxidation by-product. Since phthalide cannot be readily removed from phthalic anhydride (B.P. 284.5° C. at atmospheric pressure) by such usual physical purification techniques as distillation customarily employed in the commercial production of phthalic anhydride, phthalide (B.P. 290° C. at atmospheric pressure) contaminates the phthalic anhydride product. The amount of phthalide intermediate oxidation by-product present in the crude phthalic anhydride may vary from a maximum of about 5% to 0.5% by weight and generally may be present in amounts of from 1 to 4% by weight. The effect of the presence of only about 1% by weight phthalide in phthalic anyhdride lowers the freezing (solidification) point from 130.8° C. (no phthalide) to 130° C. Greater amounts of phthalide lower the phthalic anhydride solidification point still further. Thus the presence of phthalide in phthalic anhydride will provide an off specification product not acceptable for all commercial use of this anhydride.

An object of this invention is to provide a phthalide free phthalic anhydride product. It is also an object of this invention to provide a convenient step in the purification of phthalic anhydride for the substantially complete elimination of phthalide from phthalic anhydride. A further object of this invention is to purify phthalic anhydride containing phthalide. Another object of this invention is to provide an integrated process for the commercial production of phthalic anhydride including the combination of steps of vapor phase partial oxidation of a 1,2-dialkyl benzene in the presence of a vanadia catalyst, the recovery of phthalic anhydride from the lean converter gas, the purification of phthalic anhydride and the recovery of phthalic anhydride of commercially acceptable quality substantially free from phthalide. Still other advantages will be apparent from the following disclosure.

It has been discovered that phthalide present in phthalic anhydride can be oxidized with molecular oxygen, air, ozone or other gas containing molecular oxygen at above the temperature of the molten mixture, above 130° C., but not at a temperature which would cause destruction or charring of phthalic anhydride. The oxidation of phthalide is suitably oxidized in the range of 130 to 300° C. and preferably in the range of 150 to 200° C. The oxidation of phthalide in phthalic anhydride is carried out in the presence of a catalyst comprising bromine promoted heavy metal oxidation catalyst. The use of heavy metal oxidation catalyst alone does not in the air oxidation appear to result in a sufficiently rapid or substantially complete oxidation of phthalide to be commercially useful as will be hereinafter demonstrated. By the use of the oxidation of phthalide according to this invention, a phthalic anhydride product, substantially free from phthalide, can be recovered by distillation, preferably at reduced pressure. A reduced pressure of 50 to 100 mm. Hg is preferred.

The catalyst employed in the oxidation of phthalide according to this invention can be supplied by employing one or more forms of bromine such as elemental bromine, ionic bromine as in hydrogen bromide, sodium bromide, potassium bromate, ammonium bromide, or organic bromides such as tetrabromoethane, benzyl bromide, etc., which will give up bromine at the oxidation temperatures. The heavy metal oxidation catalyst can be suitably a metal of the group of heavy metals shown in the "Periodic Chart of Elements" appearing on pages 56 and 57 of the "Handbook of Chemistry," 8th edition, published by Handbook Publishers, Inc., Sandusky, Ohio, 1952, to supply the heavy metal or heavy metal ion portion of the catalyst. Of the heavy metal group, those metals having an atomic number not greater than 84 are suitable. Excellent results are obtained by using a metal having an atomic number 23 to 28, inclusive. Particularly excellent results are obtainable when a metal of the group consisting of manganese, cobalt, nickel, chromium, vanadium, molybdenum, tungsten, tin and cerium are utilized. Catalytic amounts of the metal may be a single metal or a combination of metals. The metal may be added to the phthalic anhydride containing phthalide in elemental, combined or ionic form. The metal can be employed in the form of a salt such as a halide, acetate, cumate, borate, nitrate, etc., or as a metal organic complex such as with acetylacetonate, the 8-hydroxy-quinolate and ethylene diamine tetra-acetate. Advantageously the catalyst is supplied by use of a heavy metal bromide, preferably manganese bromide, cobalt bromide or a mixture of these bromides.

The amount of catalyst used may vary widely in the range of 0.1 to 10% of the phthalic anhydride to be purified calculated on the basis of manganese bromide or proportions comparable thereto. The proportions of metal to bromine can be varied from their stoichiometric proportions in manganese or cobalt bromides. For example, there can be present 1 to 7 atoms of metal per atom of bromine or 1 to 10 atoms of bromine per atom of metal.

The oxidation of phthalide in phthalic anhydride product is, as hereinbefore disclosed, carried out with a melt of the mixture; i.e. above 130° C. The oxidation can be carried out at atmospheric pressure, reduced pressure (sub-atmospheric pressure) or at elevated pressure, preferably to maintain a liquid phase of phthalic anyhdride. The molecular oxygen as commercial oxygen, air, air enriched with oxygen or ozone, ozone, mixtures of gases containing 5 to 95% molecular oxygen is introduced into the liquid mixture of phthalic anhydride and phthalide containing the bromine-heavy metal catalyst for 0.25 to 4 hours, preferably 0.5 to 2 hours and phthalic anhydride substantially free from phthalide is distilled from the resulting mixture at atmospheric pressure or at reduced pressures as low as 5 to 10 mm. Hg.

To illustrate the purification step of this invention, 100 parts by weight phthalic anhydride product containing 1% phthalide by weight, solidification point 130° C., and otherwise a commercially acceptable phthalic anhydride product is combined with 0.5 part by weight each of manganese bromide and cobalt bromide as their tetrahydrates. The mixture is heated to 180° C. at atmospheric pressure and air is passed into the melt at the rate of 100 liters (measured at 25° C.) per hour for two hours. Thereafter the resulting mixture is distilled at 60 mm. Hg without a fractionation column until no further product was condensed. The solidification point of the recovered product is 130.8° C., the same as a substantially phthalide free phthalic anhydride.

When 100 parts of phthalic anhydride product containing 1% phthalide by weight is heated to 180° C. and air at the rate of 100 liters (measured at 25° C.) per hour is passed into the melt at atmospheric pressure for two hours, the phthalic anhydride recovered by distillation at 60 mm. Hg, without a fractionation column, has a solidification point of 130.2° C. This indicates that only about 25% of the phthalide has been oxidized in the absence of bromine-heavy metal catalyst. By using cobalt and/or manganese naphthenates without bromine, the oxidation of phthalide at 160 to 180° C. with air in a liquid phase containing phthalic anhydride may be somewhat better than the use of no catalyst at all (as resulting in a 130.2° C. solidification point distilled product) but may fall quite short of being substantially phthalide free as is indicated in U.S. Patent 2,925,425 wherein only about one-third of the phthalide appears to be oxidized even at 180° C. The improvement provided by the oxidative purification step of this invention is, therefore, readily apparent.

Phthalide, although forming as an intermediate oxidation by-product in the liquid phase oxidation of ortho-xylene to o-phthalic acid or mixed xylenes to mixed phthalic acids with air in the presence of a lower fatty acid and an oxidation catalyst, even in the presence of bromine-heavy metal catalyst according to U.S. Patent 2,833,816, generally is not associated with the phthalic anhydride obtained by the dehydration of o-phthalic acid for the reason that phthalide remains dissolved in the lower fatty acid such as acetic acid when o-phthalic acid is crystallized from the resulting oxidation reaction medium.

The vapor phase partial oxidation of a 1,2-dialkyl benzene containing 1 to 3 carbon atoms in the alkyl groups, especially ortho-xylene, produces a gasiform mixture containing dilute amounts of phthalic anhydride. The recovery of phthalic anhydride from such lean gases results also in the recovery of phthalide as a contaminant. Such vapor phase oxidations are carried out by passing a mixture of vapors of o-dialkyl benzene and air in high mole ratios of air to dialkyl benzene, 40 to 300 moles of air per mole of dialkyl benzene in contact with a vanadia catalyst in a fixed bed as in tubes externally heated or in a fluid bed of hot catalyst. The oxidation is carried out at 800 to 1200° F. Under these conditions meta- and para-dialkyl benzene isomers are over oxidized to mainly carbon dioxide and water. The phthalic anhydride in the gasiform mixture coming from the catalyst contact in the oxidation zone contains 0.2 to 2.5 mole percent phthalic anhydride and hence is referred to as lean gas; i.e. lean in phthalic anhydride.

The lean gas is cooled to recover phthalic anhydride as for example in the so-called "hay barn" condensers, tubular condensers whose tubes are alternately cooled and heated to first condense solid anhydride product and then melt the product, or the gas is contacted with small solid particles in a pebble bed heat exchanger wherein phthalic anhydride product is condensed, solidified and then melted and the molten product taken off in a "pinch zone" of the pebble bed. The lean gas can be scrubbed with a solvent for phthalic anhydride such as dibutyl phthalate. Many other techniques for recovery of crude phthalic anhydride product from the lean gas have been devised and employed.

The crude phthalic anhydride recovered from the lean gas contains in addition to phthalide, quinoidic impurities among others. A portion of the impurities other than phthalide are usually removed by holding the crude phthalic anhydride at elevated temperatures 130 to 300° C., suitably at reflux temperature (B.P. 284.5° C. at atmospheric pressure) or above, alone or with various treating agents such as sulfuric acid, sodium carbonate, sodium sulfite, sodium phosphate, sulfamic acid, alkali metal nitrate, among others generally to convert the impurities other than phthalide to materials of substantially higher boiling point than phthalic anhydride. Such processes for treating crude phthalic anhydride are referred to as "cooking." Thereafter phthalic anhydride is removed from the impurities converted to higher boiling substances by distillation, generally at atmospheric pressure. The resulting condensate, still not a commercially acceptable product, but often referred to as "refined crude phthalic anhydride" and contains 0.5 to 5% phthalide, is distilled, usually fractionated, at reduced pressure, 5 to 600 mm. Hg absolute. A forecut fraction about 1 to 10% of the charge, is recycled to the cooking step, the least cut fraction 80 to about 90% of the charge is the product and the bottoms is usually discarded. In the integrated process of this invention distillation of the oxidized crude refined phthalic anhydride is preferably carried out at 50 to 100 mm. Hg.

In the integrated system of this invention the oxidation of phthalide can be accomplished during the cooking step but is preferably carried out with the refined crude phthalic anhydride since some of the agents added in the cooking step tend to interfere with the oxidation.

The vanadia catalyst employed in the vapor phase partial oxidation of 1,2-dialkyl benzenes ($C_1$ to $C_3$ alkyl groups) contain various amounts of vanadium oxide with promoters as is well known in the art. The vanadia catalyst may be supported or unsupported as desired. There are many vanadia catalysts known and/or in use for the oxidation of 1,2-dialkyl benzenes, especially ortho-xylene which may be selected for the vapor phase oxidation step. The precise vanadia catalyst employed does not constitute a portion of this invention.

The integrated process of this invention typically may be carried out in the following manner. Air is carburetted with an ortho-xylene fraction containing about 90% ortho-xylene and the remaining 10% is meta- and para-xylenes. The air-xylene mixture is diluted with additional air to provide a mole ratio of 110 moles of air per mole or xylene. This air-xylene mixture is passed into tubes packed with a vanadia catalyst such as vanadium oxide on alumino or a mixture of vanadium oxide and molybdenum oxide (about 2.5 of the former per 1.0 of the latter) coated on alumina. The catalyst bed in the packed tubes is held at about 1000° F. by a circulating mixture of molten salts. The gasiform mixture from the tubes is passed alternately into a pair of condensers, one of whose tube bundles are internally cooled to 100 to 120° C. or below to condense and solidify crude phthalic anhydride while the tubes of the other are internally heated to 130 to 150° C. or above to melt the crude phthalic anhydride solidified therein. In this manner, yields of crude phthalic anhydride of 85 to 95% may be obtained. The crude phthalic anhydride melt is collected in a heated surge tank, 200 to 250° C., and held there for a retention time of about 8 to 15 hours with a cooking agent such as concentrated sulfuric acid. Thereafter the molten phthalic anhydride is subjected to distillation of about 600 to 750 mm. Hg absolute taking all material which distills over as refined crude phthalic anhydride.

The refined crude phthalic anhydride condensate containing 2% phthalide is collected in 1000 pound quantities in a vessel vented to a hot condenser 140 to 150° C., and then to the atmosphere. A mixture of cobalt and manganese bromides or their acetates and sodium bromide, to provide about 8 to 10 pounds of the mixture of cobalt and manganese bromides, are added to the molten refined crude phthalic anhydride. Air is introduced into the bottom of the vessel while the mixture is maintained at about 190 to 195° C. Air is supplied over a 2-hour period to provide 100 times the molar requirement of oxygen based on the phthalide present by introducing the air into the bottom of the melt of crude refined phthalic anhydride. This phthalic anhydride is pumped to distillation apparatus and distilled at 60 mm. Hg absolute. A forecut of about 2 to 5% is taken until specification grade phthalic anhydride appears and 90 to 97% product phthalic anhydride is distilled until material not meeting desired color specification appears in the overhead product. The forecut is recycled to the treating vessel and the residue from the distillation is discarded.

Phthalic anhydride of 131.0° F. solidification point, having a color of 10 to 20 Hazen scale may be obtained by the foregoing integrated process.

Suitable phthalic anhydride of acceptable commercial specification, substantially free from phthalide may also be obtained by passing 95–96% ortho-xylene and air into an oxidation zone in which a bed of fluidized particles, 10 to 100 microns in size, of vanadia catalyst is maintained. The mole ratio of xylene may be 1.5 to about 2.5 and an average fluid bed temperature in the range of 750 to 1000° F. may be used with contact time of 0.3 to 20.0 seconds. After disengaging catalyst particles from lean gas, crude phthalic anhydride as a melt is recovered as hereinbefore disclosed. The crude phthalic anhydride containing about 1.5% phthalide together with quinoidic impurities is heated at reflux temperature about 285° C. for 6 to 8 hours in the presence of a cooking agent to convert the quinoidic impurities to higher boiling materials. Thereafter crude refined phthalic anhydride is distilled off at about 650 mm. Hg.

The crude refined phthalic anhydride containing about 1.5% phthalide is combined with about 1% cobalt bromide and air introduced into the molten mixture at 200° C. for about 2 hours while maintaining an air rate sufficient to provide at least 14% oxygen by volume in the exit gas. Thereafter, phthalic anhydride is recovered by distillation at 100 mm. Hg absolute.

In the foregoing processes, cobalt bromide or manganese bromide can be used alone in place of the mixture thereof. Likewise either cobalt acetate or manganese acetate can be employed alone in place of a mixture thereof with ammonium bromide, sodium bromide, etc., as the source of bromine. Moreover, other of the heavy metals hereinbefore disclosed can be employed alone or in combination with cobalt and/or manganese. Likewise, other forms of bromine can be employed. Where the metal per se or a metal salt other than the bromide is to be employed, a convenient method of preparing the catalyst for use in the oxidation step is to combine the metal or salt with hydrobromic acid and add the resulting solution to the melt of crude refined phthalic anhydride. The combination of metal and/or metal salt with a bromine compound can be prepared in acetic acid as the solvent and added to the melt of crude refined phthalic anhydride. Air or other gaseous source containing molecular oxygen introduced into the melt of phthalic anhydride containing phthalide will sweep out water and/or acetic acid introduced with the catalyst components.

The oxidation of phthalide to phthalic anhydride theoretically requires only one mole oxygen per mole of phthalide. For crude refined phthalic anhydride containing 0.5 to 5% phthalide by weight only about 0.02 to 0.2 mole of air are theoretically required. However, because only a rather low concentration of phthalide is present, amounts of air or molecular oxygen in excess of the theoretical requirements are introduced. Supplying air (or oxygen) in amounts of 200 to 300 times the required theoretical amount has no apparent deleterious effect on the quality of phthalic anhydride recovered after the oxidation step. The rate of addition of air or other source of gas containing molecular oxygen is not critical with respect to the chemistry of removing phthalide according to the oxidation step of this invention and therefore resolves to a matter of process economics. A low rate of air or other gaseous source of molecular oxygen will, of course, unduly prolong the oxidation step. The maximum rate of addition will, of course, be a function of the available source of molecular oxygen; i.e. capacity of compressor, size of transfer lines, etc., the quantity of material to be treated, the characteristics of the apparatus employed for the oxidation step such as the ratio of height to diameter, the height of liquid through which the air or other source of molecular oxygen must pass, etc.

What is claimed is:

1. In the production of phthalic anhydride by the steps of vapor-phase partial oxidation of a 1,2-dialkyl benzene containing 1 to 3 carbon atoms in the alkyl group with air in the presence of a vanadia catalyst in an oxidation zone, recovering crude phthalic anhydride contaminated with phthalide from the lean gas from said oxidation zone, heating the crude phthalic anhydride at an elevated temperature above its melting point to convert a portion of impurities in the crude phthalic anhydride to higher boiling materials, distilling crude refined phthalic anhydride from said converted impurities and distilling at reduced pressure phthalic anhydride product from said crude refined phthalic anhydride, the improvement comprising: subsequent to said heating of crude phthalic anhydride for conversion of impurities to higher boiling materials and prior to at least said distillation at reduced pressure oxidizing crude phthalic anhydride with gas containing molecular oxygen at a temperature above the melting point of crude phthalic anhydride in the presence of a catalyst comprising bromine and a heavy metal oxidation catalyst thereby leaving an oxidation product from which substantially phthalide free phthalic anhydride product is recovered by distillation.

2. The process of claim 1 wherein the oxidation step is carried out with crude refined phthalic anhydride.

3. The process of claim 1 wherein the catalyst is selected from the class consisting of cobalt bromide, manganese bromide and mixtures of cobalt and manganese bromides.

4. A process for recovering phthalic anhydride from a mixture of phthalic anhydride having as substantially the sole impurity up to 5% phthalide by weight comprising oxidizing a melt of said mixture with a gas containing molecular oxygen in the presence of a catalyst comprising bromine and a heavy metal oxidation catalyst and thereafter distilling phthalic anhydride from said oxidation mixture whereby a substantially phthalide free phthalic anhydride is obtained.

5. The process of claim 4 wherein the catalyst is selected from the class consisting of cobalt bromide, manganese bromide and mixtures of cobalt and manganese bromides.

6. The process of claim 4 wherein the distillation of phthalic anhydride is carried out at a reduced pressure of 50 to 100 mm. Hg absolute.

7. A process for the preparation of phthalic anhydride substantially free from phthalide which comprises the vapor phase partial oxidation of a 1,2-dialkyl benzene with air in the ratio of 40 to 300 moles of air per mole of dialkyl benzene at 800 to 1200° F. in the presence of a vanadia catalyst, cooling the lean gas containing 0.2 to 2.5 moles phthalic anhydride per mole of gasiform mixture thereby recovering a crude phthalic anhydride product, heating the crude phthalic anhydride product at an elevated temperature of between 130° C. and 300° C. thereby converting a portion of the impurities to materials boiling substantially above phthalic anhydride, distilling a crude refined phthalic anhydride containing phthalide therefrom, oxidizing said crude refined phthalic anhydride in the liquid phase with molecular oxygen containing gas in the presence of a catalyst comprising bromine and a heavy metal oxidation catalyst, and distilling phthalic anhydride from said oxidation mixture at a reduced pressure of 5 to 600 mm. Hg absolute whereby a substantially phthalide free distillate is obtained.

8. The process of claim 7 wherein ortho-xylene is the 1,2-dialkyl benzene and air is the molecular oxygen containing gas used in the oxidation of said crude refined phthalic anhydride.

9. The process of claim 7 wherein phthalic anhydride product is distilled at 50 to 100 mm. Hg absolute.

10. The process of claim 7 wherein the catalyst is selected from the class consisting of cobalt bromide, manganese bromide and mixtures of cobalt and manganese bromides.

References Cited by the Examiner

UNITED STATES PATENTS

| | | | |
|---|---|---|---|
| 1,693,915 | 12/28 | Brode et al. | 260—346.7 |
| 2,662,901 | 12/53 | Bailey | 260—346.7 |
| 2,809,926 | 10/57 | Shrader et al. | 260—347.7 |
| 2,858,334 | 10/58 | Landau et al. | 260—346.3 |
| 2,925,425 | 2/60 | Contois et al. | 260—346.4 |
| 2,954,385 | 9/60 | Burney et al. | 260—346.8 |
| 3,053,854 | 9/62 | Saffer | 260—346.4 |

NICHOLAS S. RIZZO, *Primary Examiner.*

IRVING MARCUS, *Examiner.*